US007875364B2

(12) United States Patent
Raad et al.

(10) Patent No.: US 7,875,364 B2
(45) Date of Patent: Jan. 25, 2011

(54) ELECTRICALLY CONDUCTIVE CONNECTOR HOUSING PART

(75) Inventors: Achim Raad, Ludwigburg (DE); Ralf Kabott, Waldatentten (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 570 days.

(21) Appl. No.: 11/823,790

(22) Filed: Jun. 28, 2007

(65) Prior Publication Data

US 2008/0009166 A1 Jan. 10, 2008

(51) Int. Cl.
*B32B 9/00* (2006.01)

(52) U.S. Cl. ........................ 428/632; 428/650; 428/655

(58) Field of Classification Search ................... 174/34, 174/36, 74 R, 75 R, 80; 428/411.1, 457, 428/544, 615, 632, 641, 650, 652, 653, 688, 428/689, 699; 439/266, 269.1, 521, 524
See application file for complete search history.

(56) References Cited

U.S. PATENT DOCUMENTS 5,248,406 A * 9/1993 Kamitani .................... 205/245
5,399,808 A 3/1995 Carter et al.
2005/0109426 A1 * 5/2005 Inoue et al. ................. 148/258

FOREIGN PATENT DOCUMENTS

| | | | |
|---|---|---|---|
| CN | 1729311 | A | 2/2006 |
| DE | 10 2005 040 425 | A1 | 3/2006 |
| EP | 0 524 894 | A2 | 1/1993 |
| EP | 1 484 432 | A1 | 12/2004 |
| EP | 1 544 322 | A1 | 6/2005 |
| WO | WO 92/22115 | A1 | 12/1992 |

* cited by examiner

*Primary Examiner*—Timothy M Speer
(74) *Attorney, Agent, or Firm*—Peter Van Winkle

(57) ABSTRACT

An electrically conductive connector housing body (16, 17) of aluminum or an aluminum compound, and a surface layer on the aluminum which comprises an adhesive layer in the form of a chemical nickel-plating, a corrosion protection layer, and a metallic passivation layer provided in sequence. In order to avoid the use of toxic metals and their compounds in a housing part of this type and nevertheless to assure sufficient conductivity and corrosion resistance, the corrosion protection layer is formed by a zinc-cobalt-iron compound, the passivation layer is constituted by a compound made of trivalent chromium, and a sealing layer made of an inorganic compound containing silicate is applied as the exterior layer.

3 Claims, 1 Drawing Sheet

ELECTRICALLY CONDUCTIVE CONNECTOR HOUSING PART

CROSS-REFERENCE TO RELATED APPLICATION

Applicant claims priority from German patent application no. 10 2006 032 124.3 filed Jul. 4, 2006.

BACKGROUND OF THE INVENTION

The present invention relates to an electrically conductive component, in particular a housing part, for electrical plug connectors in accordance with the preamble of claim 1.

In currently known electrically conductive housing parts for electrical plug connectors, cadmium is used as a corrosion protection layer, and a compound containing hexavalent chromium (Cr6+) is used as a passivation layer. A layer composition of this type assures the necessary conductivity, so that the housing part can function, for example, as electrical shielding, and also sufficient corrosion resistance to environmental influences. Nevertheless, the disadvantages encountered in housing parts of this type, specifically in their layer composition, lie in the fact that cadmium is highly toxic, and compounds made of, or containing, hexavalent chromium are carcinogenic.

For the aforementioned reasons, it has been decided to ban harmful substances of this type from the manufacture of electrical and electronic components. A European Directive (RoHs) now states that, exceptions aside, toxic metals such as lead, cadmium, hexavalent chromium, and the like may not be used in electrical and electronic equipment.

It is thus the objective of the present invention to describe an electrically conductive component of the type mentioned above, in particular a housing part for electrical plug connectors, which avoids using the aforementioned metals and their compounds but which nevertheless possesses sufficient conductivity and corrosion resistance.

To achieve this objective in an electrically conductive component of the aforementioned type, in particular a housing part for electrical plug connectors, the features indicated in claim 1 are provided.

SUMMARY OF THE INVENTION

As a result of the measures described in the invention, in accordance with the RoHs Directive, toxic metals are not used and are replaced by non-toxic metals, while essentially the same level of conductivity and corrosion resistance is retained in the components. Furthermore, due to the layer sequence, better temperature resistance is achieved. The final layer, i.e., the sealing layer, in addition to providing the desired abrasion resistance, also assures advantageous sliding properties and prevents the potential creation of craters in the surface when the plug connector is plugged and unplugged.

On the basis of the features in accordance with claim 2, it is advantageously achieved that, first, the passivation of this layer is possible as a result of the subsequently applied, trivalent chromium compound and, second, it is assured that the passivation layer assures the desired black appearance of the component surface.

Other advantageous embodiments can be derived from the features of one or more of claims 3 to 7.

Further details of the present invention can be found in the following description of one preferred exemplary embodiment.

Further details of the present invention can be derived from the following description, in which the invention is described and discussed in greater detail on the basis of the exemplary embodiments depicted in the drawing. In the drawing:

DESCRIPTION OF THE INVENTION

Figure 2:
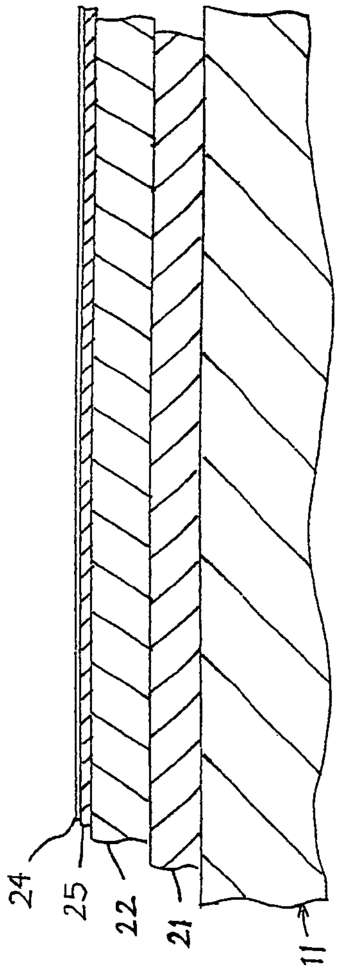
FIG. 2 is an enlarged sectional view of the surface region of one of the housing parts of FIG. 1.
Figure 1:
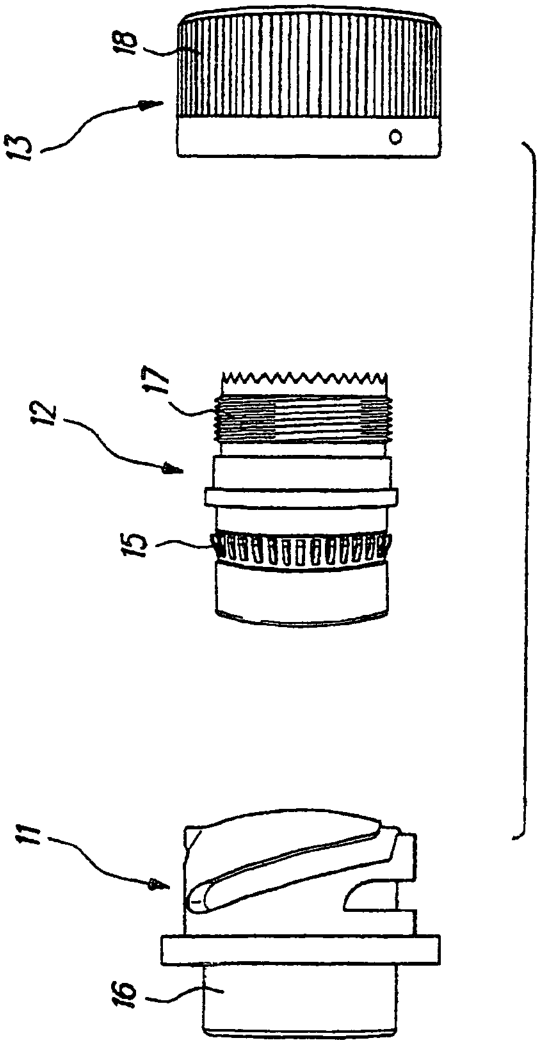
FIG. 1 is a perspective view of three parts of a housing of an electrical plug connector.

The plug connector, depicted only partially in FIG. 1, has here three housing parts 11, 12, and 13, of which one housing part 11 contains a multiplicity of female plugs, undepicted, and the other housing part 12 contains a multiplicity of male plugs, also undepicted, that fit in plug-like fashion into the female plugs of first housing part 11. A third housing part 17 has the shape of retainer nut, which holds other housing part 12 plugged into first housing part 11 in a bayonet joint across first housing part 11. Second housing part 12 in the area around the male plugs has a contact rim 15 having spring-action contact lugs to achieve the electrically conductive connection of second housing part 12 within first housing part 11. Undepicted are the corresponding electrical cables that are connected to the female plugs and male plugs, and their mountings that are sealed to the outside.

Both first housing part 11 and second housing part 12, without contact rim 15, as well as third housing part 13 are manufactured from materials that have not only mechanical strength but also sufficient conductivity for shielding the plug contact connections, as well as a level of corrosion resistance that is appropriate to the environmental influences that are encountered during robust operation out of doors. On the basis of the European RoHs Directive, which has entered into force, the aforementioned objective is achieved by the present invention through metallic materials that conform to this Directive, i.e., that are non-toxic or harmless for humans.

All housing parts 11, 12, and 13, are designed in the same manner. Housing parts 11, 12, and 13 have a body 16, 17, or 18, each of which has Rs own geometrical shape and each of which is a die-cast part that is made of aluminum or a suitable aluminum alloy.

Body 16, 17, 18, is then subjected to a chemical nickel-plating 21, preferably without cadmium or lead, and is in this way coated with a chemical nickel-plating as an adhesive layer having a thickness in the range of 5 to 8 μm.

The subsequent layer 22, having a thickness in the range of 5 to 13 μm, is made of a zinccobalt (ZnCo) compound as a highly-alkaline electrolyte, thereby constituting a corrosion protection layer. The zinc-cobalt-iron compound contains metallic cobalt/iron in a proportion that lies within the range of 0.7 to 1%. This percentage of cobat/iron acts to achieve both the subsequent passivation by a further layer as well as the preferred black exterior color for housing parts 11, 12, and 13. The corrosion protection is increased, accordingly.

A passivation layer 25 made up of a chromium-III compound is provided on top of the zinc-cobalt-iron layer This layer, made of the silver-free, black passivation, and based on the trivalent chromium compound, has a thickness in the range of 0.5 to 1 μm.

To furnish this layer composition with the appropriate and desired abrasion resistance as well as with sliding properties during plugging and unplugging, i.e., when housing parts 11,12, or 13 are inserted and removed, a sealing layer 24 having a thickness in the order of magnitude of 0.01 to 0.02 μm is provided as the exterior layer of the layer composition as described above. This sealing layer is made of an inorganic silicate-containing compound.

As mentioned above, housing parts 11, 12, and 13, are given a dark, essentially black exterior color in the end finish.

Mechanical durability tests have demonstrated sufficient mechanical strength as well as consistent electrical shielding capacities. Corrosion tests involving spraying the components in question with a salt solution have not yielded any factors that would disadvantageously influence the electrical and mechanical properties.

What is claimed is:

1. An electrically conductive connector that includes a body (16, 17, 18) that comprises aluminum and a surface layer comprising an adhesive layer (21) in the form of a chemical nickel-plating, a corrosion protection layer (22), and then a metallic passivation layer (25) are provided in sequence, wherein:

the corrosion protection layer (22) is constituted by a zinc-cobalt-iron compound, the passivation layer (25) is a compound made of trivalent chromium, and an exterior layer is a sealing layer (24) made of an inorganic compound containing silicate, wherein said passivation layer consists of a silver-free black passivation layer, based on a chromium-III compound.

2. The connector as recited in claim 1, wherein the passivation layer has a thickness that lies in the range of 0.5 μm to 1 μm.

3. The connector as recited in any of claim 1, wherein the sealing layer containing silicate has a thickness of 0.01 μm to 0.02 μm.

* * * * *